(12) United States Patent
Ogata et al.

(10) Patent No.: US 6,530,464 B2
(45) Date of Patent: Mar. 11, 2003

(54) ONE-WAY CLUTCH DEVICE

(75) Inventors: Hirofumi Ogata, Kakegawa (JP);
Hirobumi Shirataki, Fukuroi (JP);
Tomoharu Ando, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 0 days.

(21) Appl. No.: 09/776,763

(22) Filed: Feb. 6, 2001

(65) Prior Publication Data

US 2001/0011623 A1 Aug. 9, 2001

(30) Foreign Application Priority Data

Feb. 7, 2000  (JP) .................................. 2000-029283
Dec. 27, 2000  (JP) .................................. 2000-398959

(51) Int. Cl.$^7$ ............................................. F16D 13/74
(52) U.S. Cl. ................................................. 192/113.32
(58) Field of Search ........................... 192/113.32, 45, 192/45.1

(56) References Cited

U.S. PATENT DOCUMENTS

| | | | | |
|---|---|---|---|---|
| 3,175,661 A | * | 3/1965 | Maurer et al. | 192/113.32 |
| 4,757,887 A | * | 7/1988 | Ostrander et al. | 192/45 |
| 4,874,069 A | * | 10/1989 | Lederman | 192/45 |
| 4,913,271 A | * | 4/1990 | Kinoshita et al. | 192/113.32 |
| 4,953,353 A | * | 9/1990 | Lederman | 192/45 |
| 5,029,688 A | * | 7/1991 | Hayakawa et al. | 192/113.32 |
| 5,135,085 A | * | 8/1992 | Kinoshita et al. | 192/113.1 |
| 5,601,175 A | * | 2/1997 | Kinoshita et al. | 192/113.32 |
| 5,671,836 A | * | 9/1997 | Shirataki et al. | 192/113.32 |
| 5,687,826 A | * | 11/1997 | Kinoshita et al. | 192/113.32 |
| 6,338,402 B1 | * | 1/2002 | Muramatsu et al. | 192/45 |

FOREIGN PATENT DOCUMENTS

JP     57-18850 A   *   1/1982

* cited by examiner

*Primary Examiner*—Rodney H. Bonck
(74) *Attorney, Agent, or Firm*—Miles & Stockbridge P.C.

(57) ABSTRACT

A one-way clutch device comprises a plurality of torque transmitting members interposed between an inner race and an outer race for transmitting a rotation between the inner race and the outer race through the torque transmitting members only in one direction of rotation. A side part of the inner race is formed with a plurality of oil paths for supplying lubricating oil.

9 Claims, 11 Drawing Sheets

ONE-WAY CLUTCH DEVICE

This application claims the benefits of Japanese Applications No. 2000-029283 and No. 2000-398959 which are hereby incorporated by reference.

BACKGROUD OF THE INVENTION

1. Field of the Invention

The present invention relates to a one-way clutch device for constituting an automatic transmission, or the like, for a car, and more specifically, to the technology for achieving appropriate lubrication, or the like, in sliding parts.

2. Related Background Art

Generally, an automatic transmission for a car is provided with a sun and planet gear mechanism of three to five speed levels, in addition to a torque converter serving as a fluid coupling, so as to change the speed by properly fixing or releasing constituent elements (such as a sun gear or a planet gear) of the sun and planet gear mechanism by means of frictional engagement means such as a clutch or a brake. As the frictional engagement means to be assembled in an automatic transmission, there is employed a wet-type multiple disc means in which friction plates and separator plates are alternately arranged, except in a specific type of a band brake, and the pressure oil supplied from a transmission control oil pressure circuit is used for the pressure contact (frictional engagement) between the both plates. Some of such frictional engagement means employ a structure in which a one-way clutch device is assembled therein, and a gear shaft, and the like, are freely rotated in one direction of rotation, thereby facilitating the transmission control.

FIG. 16 shows a longitudinal cross section of a conventional one-way clutch device which is incorporated in the frictional engagement means. Such one-way clutch device 1 is composed of an inner race 5 which is formed with an oil path 31 to be open on the outer peripheral surface thereof, an outer race 9 which is supported to be coaxial and to be rotatable relatively with this inner race 5, a one-way clutch mechanism 51 interposed between the inner race 5 and the outer race 9, etc. The one-way clutch mechanism 51 is composed of a large number of sprags 55 serving as torque transmitting members, ribbon springs 57 for retaining and, at the same time, for biasing the sprag 55 in the direction of engagement, an outer retainer 59 for retaining the ribbon springs 57 annularly, an inner retainer 61 for suppressing an excessive inclination of each sprag 55 together with the outer retainer 59, a pair of end bearings 63 for retaining the both retainers 59 and 61 with a predetermined gap therebetween so as to secure an operation of the sprag 55, and a synthetic resin washer 64 which is in a sliding contact with the outer side surface of the left end bearing 63 shown in FIG. 16.

In this one-way clutch device 1, while the inner race 5 is fixed, the outer race 9 is rotated, whereby the one-way clutch mechanism 51 is rotated together with the outer race. In FIG. 16, the member denoted by reference numeral 65 is a snap ring, the member denoted by reference numeral 67 is a latching plate which is fixed by the snap ring 69. Both members are adapted to restrict a movement of the one-way clutch mechanism 51 in the axial direction.

In the one-way clutch device 1 described above, since the inner race 5 is fixed, the lubrication using the centrifugal force can not be conducted, so that lubricating oil is sent with pressure to the oil path 31 of the inner race 5 by a forcible lubrication means such as an oil pressure pump. As indicated by the arrow in FIG. 16, the lubricating oil supplied from the inner peripheral side of the inner race 5 flows into the inner peripheral side of the sprag 55 through the oil path 31 and then flows out from gaps between the end bearing 63, the snap ring, and a side plate 65 and the inner race 5. Then, since the sprag 55 and the end bearing 63 are rotated integrally with the outer race 9, the sliding surfaces between these members and the inner race 5 are lubricated by the supplied lubricating oil. However, an opening portion of the oil path 31 is formed on the outer peripheral surface of the inner race 5 which is in sliding contact with the sprag 55. Thus, there arises a problem that a surface pressure generated in the sprag 55 partially increases when the torque is transmitted (when the one-way clutch mechanism 51 is operated).

On the other hand, in the one-way clutch device described above, since the torque transmitting members (sprags) rotating with the outer race are brought into sliding contact with the outer peripheral surface of the inner race, the lubrication described above can be conducted in the manner as described above even if the inner race is an element on the fixed side. However, when the torque transmitting members (such as steel balls) serve as elements on the fixed side together with the inner race, the lubricating oil hardly reaches a sliding surface between the outer race and the torque transmitting member, so that the lubrication between the inner peripheral surface of the rotating outer race and the torque transmitting members can not be conducted smoothly. Particularly, when there is a small gap between the one-way clutch mechanism and the surrounding members, it is very difficult to secure an oil path for supplying the lubricating oil in a required amount to the sliding surfaces.

SUMMARY OF THE INVENTION

The present invention has been contrived to take the above circumstances into consideration, and an object thereof is to provide a one-way clutch for providing appropriate lubrication for sliding portions.

In order to solve the above problems, according to a primary aspect of the invention, there is provided a one-way clutch device comprising a plurality of torque transmitting members interposed between an inner race and an outer race for transmitting a rotating force between the inner race and the outer race through the torque transmitting members only in one direction of rotation, in which a side part of the inner race is formed with a plurality of oil paths for supplying the lubricating oil. According to this one-way clutch of the primary aspect of the invention, since no lubricating oil outflow port, or the like, is formed on the inner race, the lubricating oil is supplied without increase of the surface pressure of the torque transmitting member.

Also according to a second aspect of the invention in the one-way clutch device of the primary aspect, an annular member may be provided to face the inner race and the torque transmitting members to be fixed with respect to the inner race and the torque transmitting members, and the oil paths are formed through the annular member. According to this feature of the second aspect of the present invention, the lubricating oil passing through the oil paths reaches the inner peripheral side of the outer race since, for example, the oil paths are formed to be extended to the outer side of the torque transmitting members.

Also according to a third aspect of the present invention, in the one-way clutch device of the primary aspect of the present invention, an annular member may be formed to face the inner race and the torque transmitting members to be fixed with respect to the inner race and the torque transmitting members, and the oil paths are formed between the torque transmitting members and the annular member.

According to the third aspect of this invention, the oil paths can be formed comparatively easily to easily cope with a change of the form of the oil paths.

Also, according to a fourth aspect of the present invention, the one-way clutch device of the primary aspect of the present invention may be provided with an annular member which is provided to face the inner race and the torque transmitting members to be fixed with respect to the inner race and the torque transmitting members and a latching plate which is rotated relatively to the annular member together with the outer race, wherein the oil paths are formed on the annular member to be open to the latching plate. According to the fourth aspect of the present invention, when the annular member and the latching plate are rotated relatively to each other, the lubricating oil flowing into the oil paths is guided to the outer peripheral direction by the centrifugal force, and this lubricating oil generates an action for separating the annular member from the latching plate to thereby decrease the dragging torque.

Also according to a fifth aspect of the present invention, in the one-way clutch device of the fourth aspect, the annular member may be provided with a communication oil path for communicating the oil paths with the surface on which the torque transmitting members are formed.

According to the fifth aspect of the present invention, the lubricating oil which is guided through the oil paths in the outer peripheral direction by the centrifugal force is supplied to the torque transmitting members, and the like, through the communication oil path.

Also according a sixth aspect of the present invention, in the one-way clutch device of the second to fifth aspect, the annular member may be a retainer made of synthetic resin. According to this sixth aspect, it is possible to form the oil paths comparatively easily, and to cope with a change of the form of the oil paths easily.

Also according to a seventh aspect of the present invention, in the one-way clutch device of the sixth aspect, the oil path may be a communication hole formed in a flange portion of the retainer. According to this feature of the seventh aspect, the lubricating oil may be directly supplied to the sliding surface of the torque transmitting member or the bearing member required to be lubricated.

Also according to an eighth aspect of the present invention, in the one-way clutch device of the primary to seventh aspect, a lubricating oil outflow port of the oil path may be provided to be adjacent to at least one of the torque transmitting member and the bearing member. According to this feature of the eighth aspect, the lubricating oil is directly supplied to the sliding surface of the torque transmitting member or the bearing member required to be lubricated.

Also according to a ninth aspect of the present invention, in the one-way clutch device of the sixth aspect, the oil path may be a groove which is formed in the flange portion of the retainer. According to this feature of the ninth aspect, it is possible to form the oil path comparatively easily, and to cope with a change of the form of the oil path easily.

Also according to a tenth aspect of the present invention, in the one-way clutch device of the primary to ninth aspect, the lubricating oil inflow port may be stretched toward the opening end thereof. According to this feature of the tenth aspect, the lubricating oil is taken into the oil paths with efficiency.

Also according to an eleventh aspect of the present invention, in the one-way clutch device of the primary to tenth aspect, the lubricating oil inflow ports of the oil paths may be communicated with each other. According to this feature of the eleventh aspect, the lubricating oil is taken into the oil paths with efficiency.

Also according to an twelfth aspect of the present invention, in the one-way clutch device of the primary to eleventh aspect, the each of the lubricating oil outflow ports of the oil paths may be open toward at least one sliding surface of the torque transmitting member or the bearing member. According to this feature of the twelfth aspect, the lubricating oil is directly supplied to the sliding surface of the torque transmitting member or the bearing member required to be lubricated.

Also according to a thirteenth aspect of the present invention, in the one-way clutch device of the twelfth aspect, each of the lubricating outflow ports may have a step portion. According to this feature of the thirteenth aspect, the lubricating oil is directly supplied to the sliding surface of the torque transmitting member or the bearing member required to be lubricated.

Also according to a fourteenth aspect of the present invention, in the one-way clutch device of the primary to thirteenth aspect, the inner race may have a cam surface on the outer peripheral surface thereof and the torque transmitting members may be interposed between the cam surface of the inner race and the outer peripheral surface of the outer race; and the one-way clutch device may further comprise a biasing means for biasing the torque transmitting members in the direction of engagement, a block bearing for forming a predetermined gap between the inner race and the outer race, and a retainer for retaining the torque transmitting members, the biasing means and the block bearing.

Also according to a fifteenth aspect of the present invention, in the one-way clutch device of the primary to the fourteenth aspect, the inner race may be an element on the fixed side and the outer race may be an element on the rotating side.

DESCRIPTION OF THE EMBODIMENTS

Figure 1:
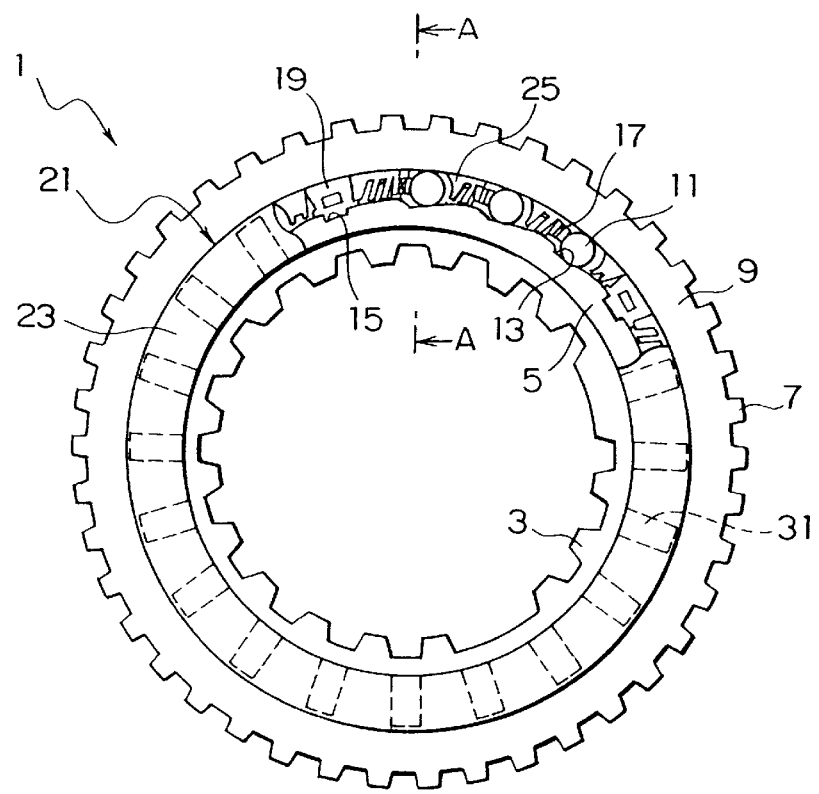
FIG. 1 is a front view of a one-way clutch device according to a first embodiment of the present invention.
Figure 2:
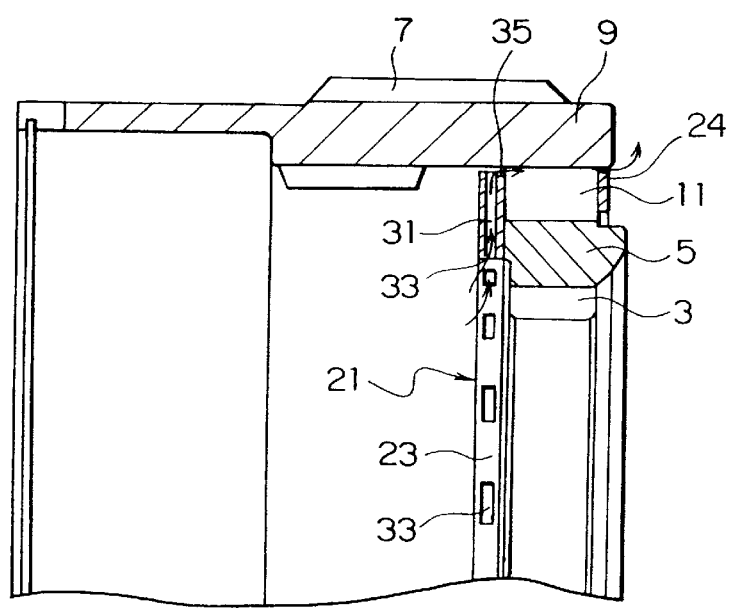
FIG. 2 is an enlarged cross-sectional view taken along line A—A in FIG. 1.

Embodiments of a one-way clutch device according to the present invention will be fully described below with reference to the drawings. FIG. 1 is a front view of a one-way clutch device according to the first embodiment of the present invention, while FIG. 2 is an enlarged cross-sectional view taken along line A—A in FIG. 1. The one-way clutch device of the present first embodiment is incorporated in a wet-type multiple disc clutch of an automatic transmission which, however, is not related to the substance of the present invention. Thus, description of the wet-type multiple disc clutch per se will be omitted. In the following description of the embodiment, the left side of FIG. 2 is assumed to be the front side of the clutch for convenience's sake.

As shown in FIG. 1 and FIG. 2, the one-way clutch device 1 is typically composed of an annular inner race 5 having a spline 3 on the inner peripheral surface thereof, a cylindrical outer race 9 having a spline 7 on the outer peripheral surface thereof and is provided coaxially with and rotatably relatively to the inner race 5, and a large number of rollers 11 serving as torque transmitting members interposed between the inner race 5 and the outer race 9. On the outer peripheral surface of the inner race 5, there are provided a plurality of concave cams 13 formed along the circumferential direction and a plurality of latching grooves 15 formed along the axial direction. Each of the rollers 11 is disposed between the outer peripheral surface of the inner race 5 and the concave cam 13, and is biased in the direction of engagement inside the concave cam 13 by an accordion spring 17. Block bearings 19 made of oil-impregnated sintered alloy are respectively engaged with the latching grooves 15, and a gap between the inner race 5 and the outer race 9 is held by each of these block bearing 19. In the drawings, the member denoted by reference numeral 21 is a retainer which is integrally composed of first and second flange portions 23 and 24, a column portion 25, and the like, so as to retain the rollers 11, the accordion spring 17 and the block bearings 19 between the inner race 5 and the outer race 9.

Figure 3:
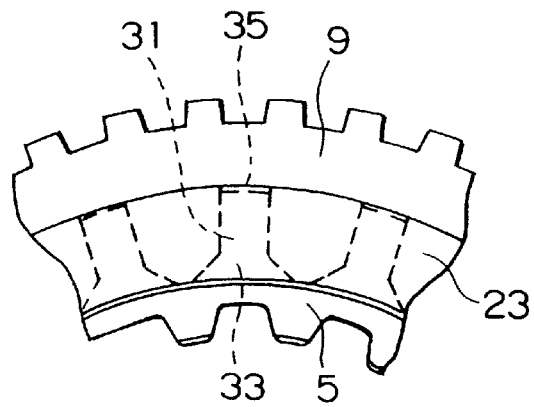
FIG. 3 is an enlarged view for showing the essential portion of a first variation of the first embodiment.
Figure 4:
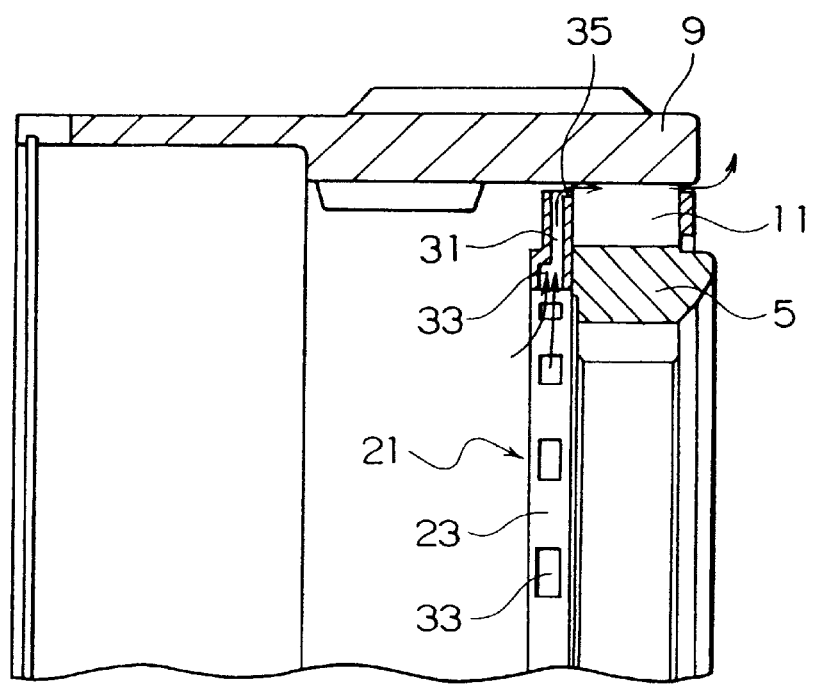
FIG. 4 is an enlarged view for showing the essential portion of a second variation of the first embodiment.

Inside the first flange portion 23 of the retainer 21, a plurality of oil paths 31 each in the form of a communication hole are formed radially at positions adjacent to the rollers 11 and the block bearings 19. A lubricating oil inflow port 33 of the oil path 31 is open on the inner peripheral surface side of the retainer 21, while a lubricating outflow port 35 of the oil path 31 is open on the inner peripheral surface side of the outer race 9. In case of the present first embodiment, the retainer 21 is formed of synthetic resin by injection molding, and the oil path 31 is formed by a metal mold by injection molding. FIG. 3 shows the first variation of the first embodiment, while FIG. 4 shows the second variation thereof. As shown in these drawings, the lubricating oil inflow port 33 is stretched toward the opening end in the circumferential direction in the first variation, while the lubricating oil inflow port 33 is stretched toward the opening end in the axial direction in the second variation.

Figure 5:
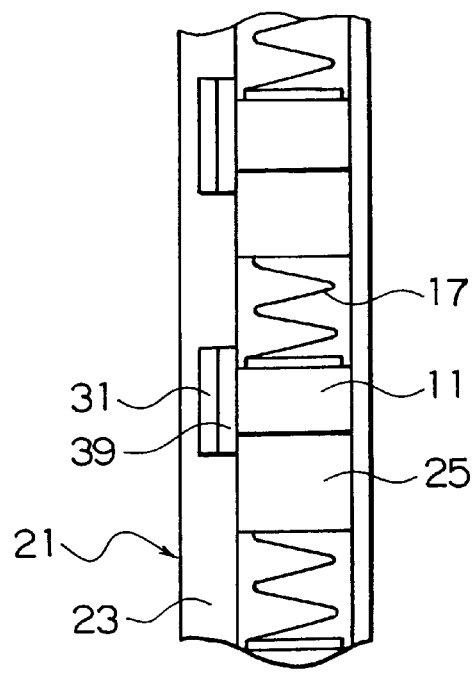
FIG. 5 is a plan view for showing an oil path in the first variation.
Figure 6:
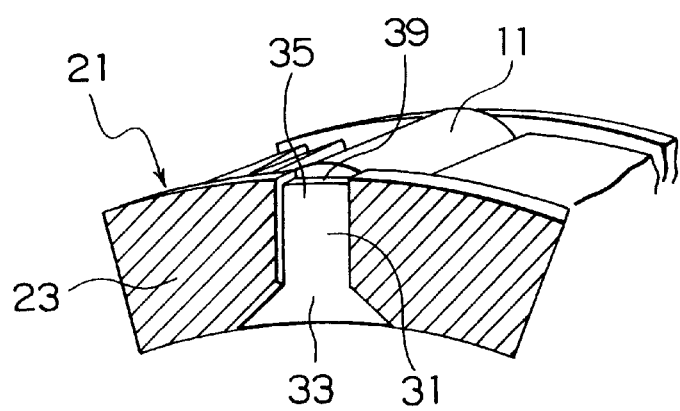
FIG. 6 is a perspective view of a retainer with a longitudinal section of a flange portion.

FIG. 5 is a plan view for showing the oil path 31 in the first variation of the first embodiment, while FIG. 6 is a perspective view of the retainer 21 with a longitudinal section of the flange portion 23. As shown in these drawings, the retainer 21 locks and retains the accordion spring 17 by means of the column portion 25 thereof, and the roller 11 is biased by the accordion spring 17 in the direction of engagement to be retained with the adjacent column portions 25. An opening portion 39 is formed in the lubricating outflow port 35 of the oil path 31 on the side of the outer race 9.

An operation of the first embodiment will be described in the following.

In the present first embodiment, when the automatic transmission is started to operate, the lubricating oil from an oil pressure pump is supplied to the oil path 31 through an unrepresented oil gallery. On this occasion, since the opening end of the lubricating oil inflow port 33 is stretched in the first and second variations, the lubricating oil easily flows into the oil path 31. Then, the lubricating oil flowing into the oil path 31 flows out from the opening portion 39 which is formed in the lubricating oil outflow port 35 toward the side of the roller 11 and the block bearing 19, so as to lubricate the sliding surfaces between these members and the inner peripheral surface.

Figure 7:
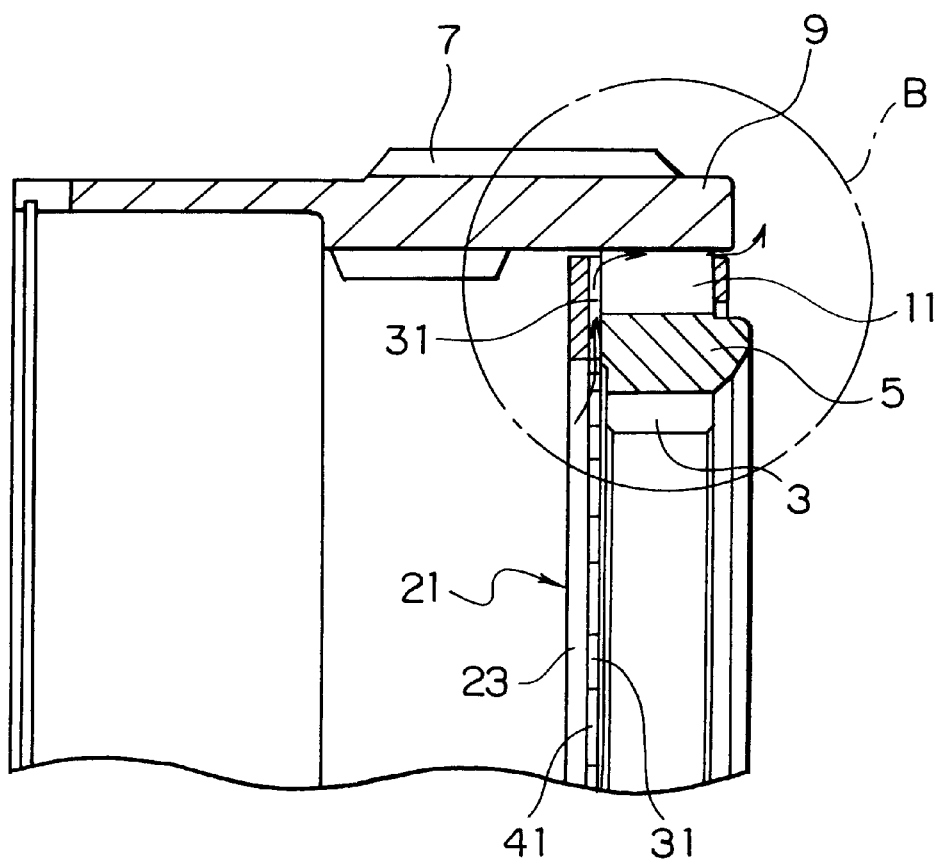
FIG. 7 is a longitudinal cross-sectional view for showing the essential portion of a one-way clutch device according to a second embodiment of the present invention.
Figure 8:
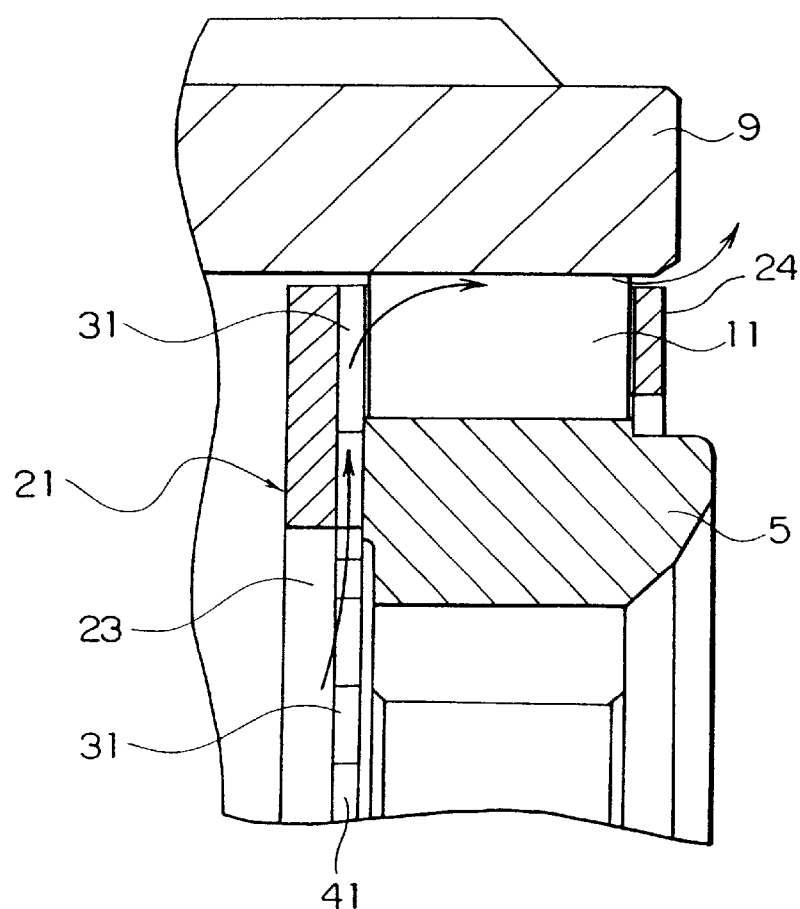
FIG. 8 is a view for showing the portion B in FIG. 7 in an enlarged manner.
Figure 9:
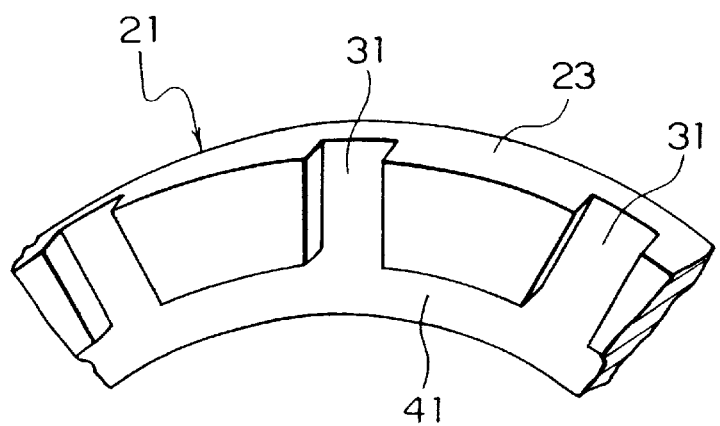
FIG. 9 is a perspective view for showing the essential portion of a retainer according to the second embodiment in an enlarged manner.

FIG. 7 is a longitudinal cross-sectional view for showing the essential portion of a one-way clutch device according to the second embodiment of the present invention, FIG. 8 is a view for showing the portion B in FIG. 7 in an enlarged manner, and FIG. 9 is a perspective view for showing the essential portion of a retainer in an enlarged manner. The entire structure of the second embodiment is the same as that of the first embodiment, except certain differences which will be described in the following.

In the second embodiment, as shown in FIGS. 7 to 9, a plurality of oil paths 31 each in the form of a communication hole are formed radially on the inner side surface of the first flange portion 23 of the retainer 21. In case of the present second embodiment, each oil path 31 is disposed in a rotation phase different from that of the roller 11 in order to prevent interference with the roller 11 or fitting-in of the roller 11 at the time of operation of engagement. Also, on the inner side surface of the first flange portion 23, an annular groove 41 is formed on the inner peripheral side, and the oil paths 31 are communicated by this annular groove 41.

An operation of the second embodiment will be described in the following.

In the present second embodiment, when the automatic transmission is started to operate, the lubricating oil supplied from the oil pressure pump (not shown) is supplied to the oil path 31 through the unrepresented oil gallery. On this occasion, since the lubricating oil once flows into the annular groove 41, the lubricating oil is taken into the oil path 31 with higher efficiency, compared with a case in which only the oil path 31 is employed. Then, the lubricating oil flowing into the oil path 31 flows out from the outer peripheral end thereof toward the side of the roller 11 or the block bearing 19, so as to lubricate the sliding surfaces between these members and the inner peripheral surface of the outer race 9.

As described above, in the one-way clutch devices of the foregoing two embodiments, since the oil paths 31 are formed in the first flange portion 23 of the retainer 21, lubrication between the inner peripheral surface of the outer race 9 and the rollers 11, etc., which are elements on the rotating side can be effected effectively even if the inner race 5 is an element on the fixed side.

Figure 10:
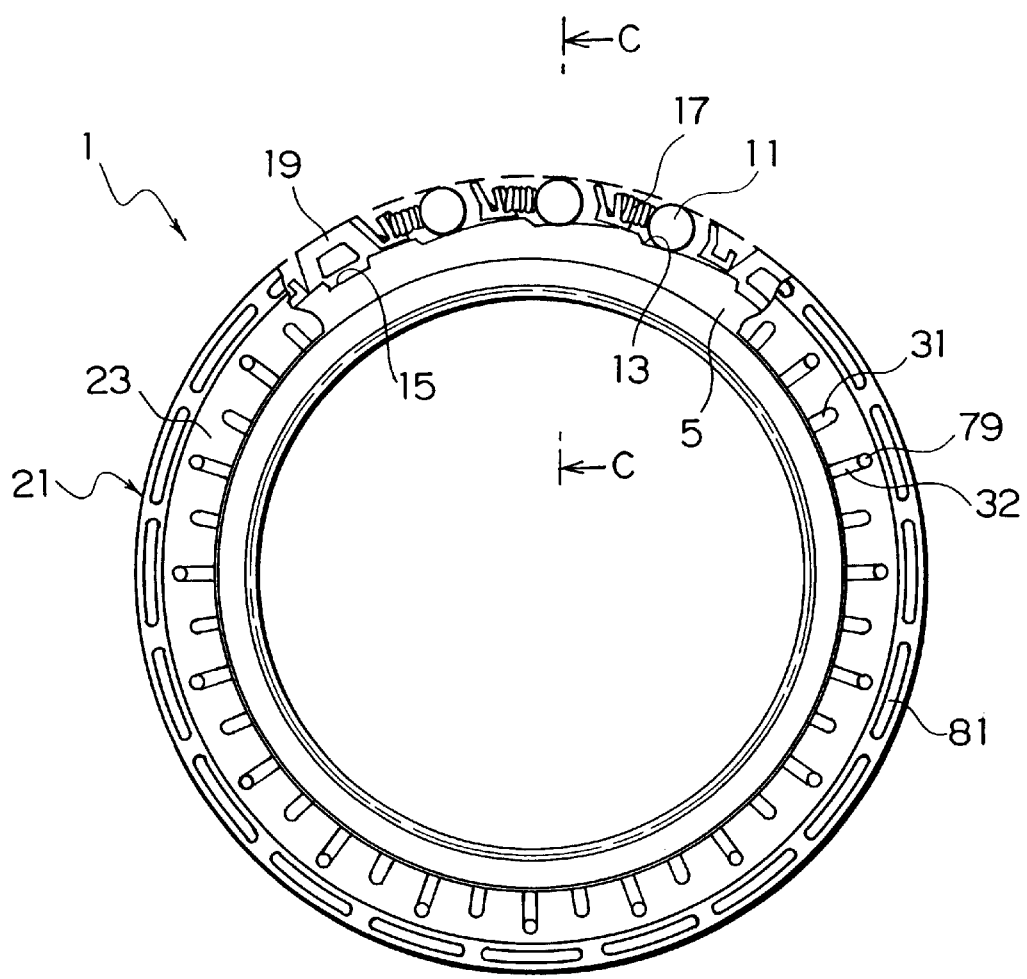
FIG. 10 is a front view of a one-way clutch device according to a third embodiment of the present invention.
Figure 11:
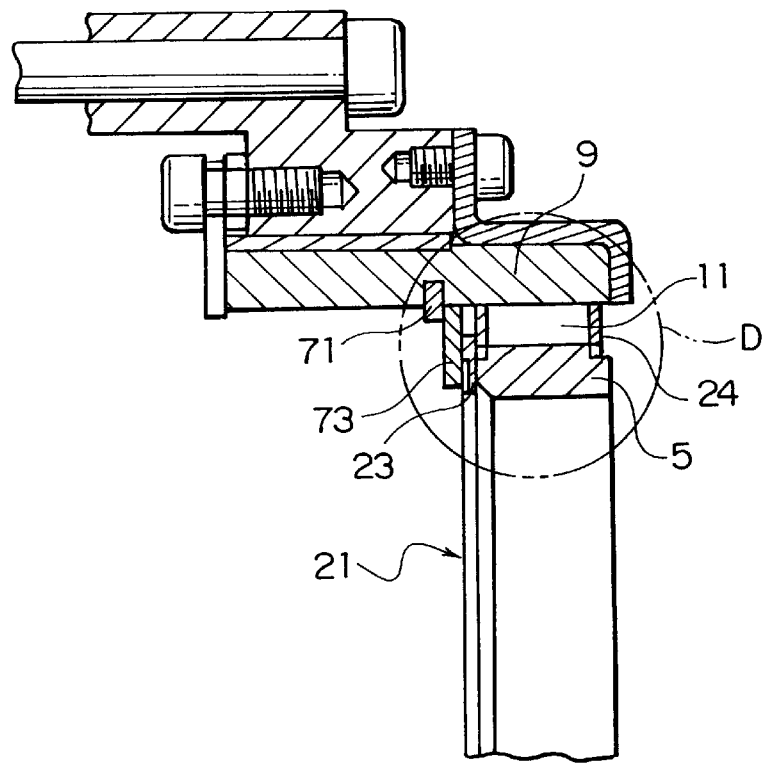
FIG. 11 is an enlarged cross-sectional view taken along line C—C in FIG. 1.
Figure 12:
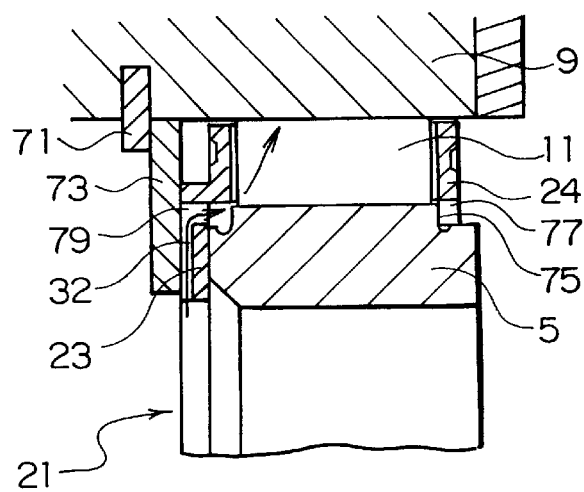
FIG. 12 is a view for showing the portion D in FIG. 11 in an enlarged manner.

FIG. 10 is a front view of a one-way clutch device according to the third embodiment of the present invention, FIG. 11 is a cross-sectional view taken along line C—C in FIG. 10, and FIG. 12 is a view for showing the portion D in FIG. 11 in an enlarged manner. The entire structure of the third embodiment is also substantially the same as that of the first embodiment described above, so that the members having the identical functions to those in the first embodiment have the same reference numerals and symbols, and description will be made only on the portions having largely different functions or forms. Note that in FIG. 10, the outer race 9 and the like are omitted for illustration.

Figure 13:
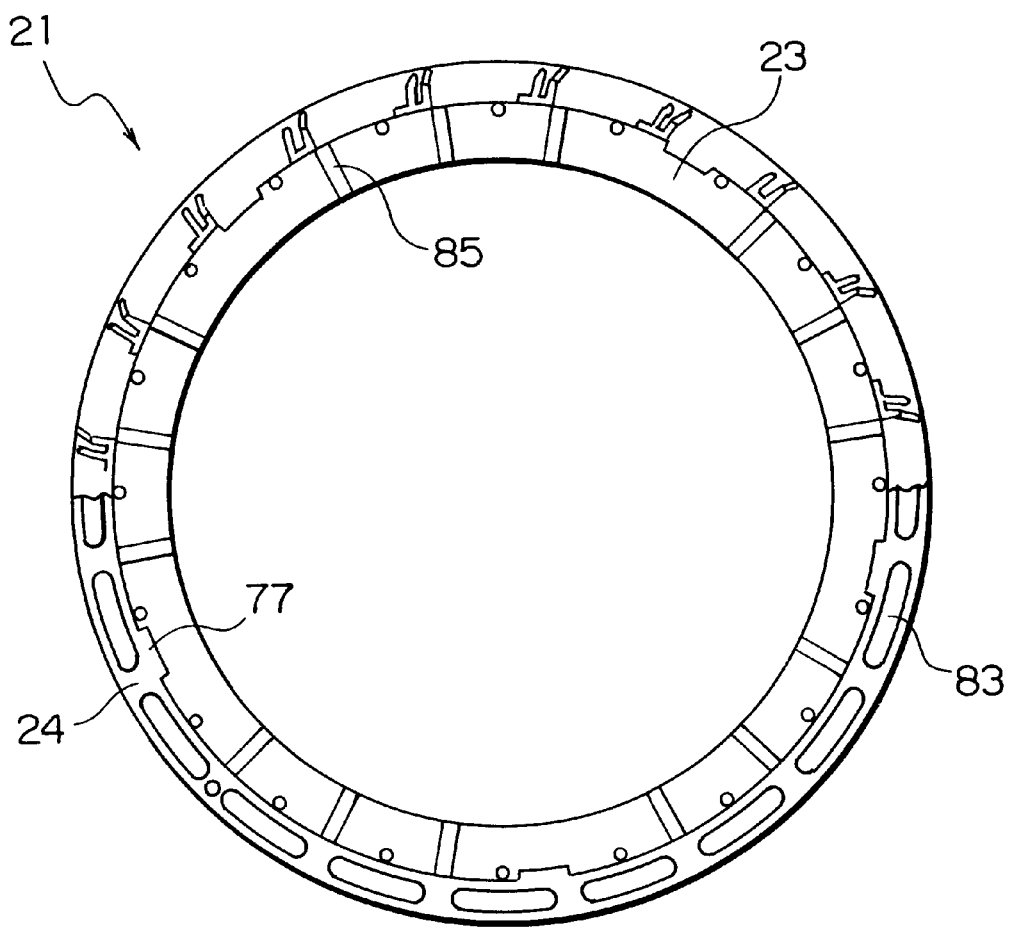
FIG. 13 is a back view of a retainer according to the third embodiment.

In the third embodiment, as shown in FIG. 11, a latching plate 73 which is fixed to the inner periphery of the outer race 9 by a snap ring 71 is in sliding contact with the left side surface of the retainer 21 in the drawing, whereby the movement of the rollers 11, the accordion springs 17, the block bearings 19, and the retainer 21 to the left in the axial direction is restricted. Also, as shown in FIG. 10 and FIG. 13 (the back view of the retainer 21), protrusions 77 to be engaged with a step portion 75 of the inner race 5 are formed on the inner peripheral side of the second flange 24, whereby the movement of the rollers 11, the accordion springs 17, the block bearings 19, and the retainer 21 in the axial direction with respect to the inner race 5 of the retainer 21 is restricted. Note that when the one-way clutch device 1 is to be assembled, the protrusions 77 are passed through latching grooves 15 for the block bearings 19 which grooves are formed in the inner race 5.

On the outer side surface of the first flange portion 23 of the retainer 21, as shown in FIG. 10, there are alternately and radially formed a plurality of oil paths 31 and 32 each in the form of a groove. The tip ends of these oil paths 31 and 32 are extended to substantially corresponding positions in the vicinity of the outer peripheral surface of the inner race 5, and communication oil paths 79 are formed to be open on the inner race 5 side at the tip ends of the oil paths 32 which occupy a half in number of the total oil paths. In FIGS. 10 and 13, reference numerals 81 and 83 denote oil pools which are formed in the first and second flanges 23 and 24, while a reference numeral 85 denotes grooves radially formed on the inner side surface of the first flange portion 23.

An operation of the third embodiment will be described in the following.

In the third embodiment, when the automatic transmission is started to operate, the lubricating oil ejected from an unrepresented oil pressure pump is supplied to the oil paths 31 and 32 of the retainer 21 through an unrepresented oil gallery. In the third embodiment, the lubricating oil flowing into the oil paths 31 and 32 is caused to adhere with viscosity to the latching plate 73 which is rotated together with the outer race 9, so that the lubricating oil is caused to flow outward in the oil paths 31 and 32 by the centrifugal force.

Then, the lubricating oil flowing into the oil paths 32 is supplied to the inside of the retainer 21 through the communication oil paths 79 and, like in the foregoing first embodiment, is used to lubricate the sliding surfaces between the rollers 11 as well as the block bearings 19 and the inner peripheral surface of the outer race 9. On the other hand, the lubricating oil flowing into the oil path 31 forms an oil film between the retainer 21 and the latching plate 73, so as to lubricate the sliding surface between the both members. Further, when the lubricating oil is leaked from the oil paths 31, the retainer 21 and the latching plate 73 are spaced apart. Note that the retainer 21 of the present embodiment is formed of synthetic resin, so that even if the lubricating oil is delayed in supply at the start of driving, there arises little abrasion or burn due to the sliding contact with the latching plate 73. Thus, the resin washer used in the conventional device is no longer required.

Figure 14:
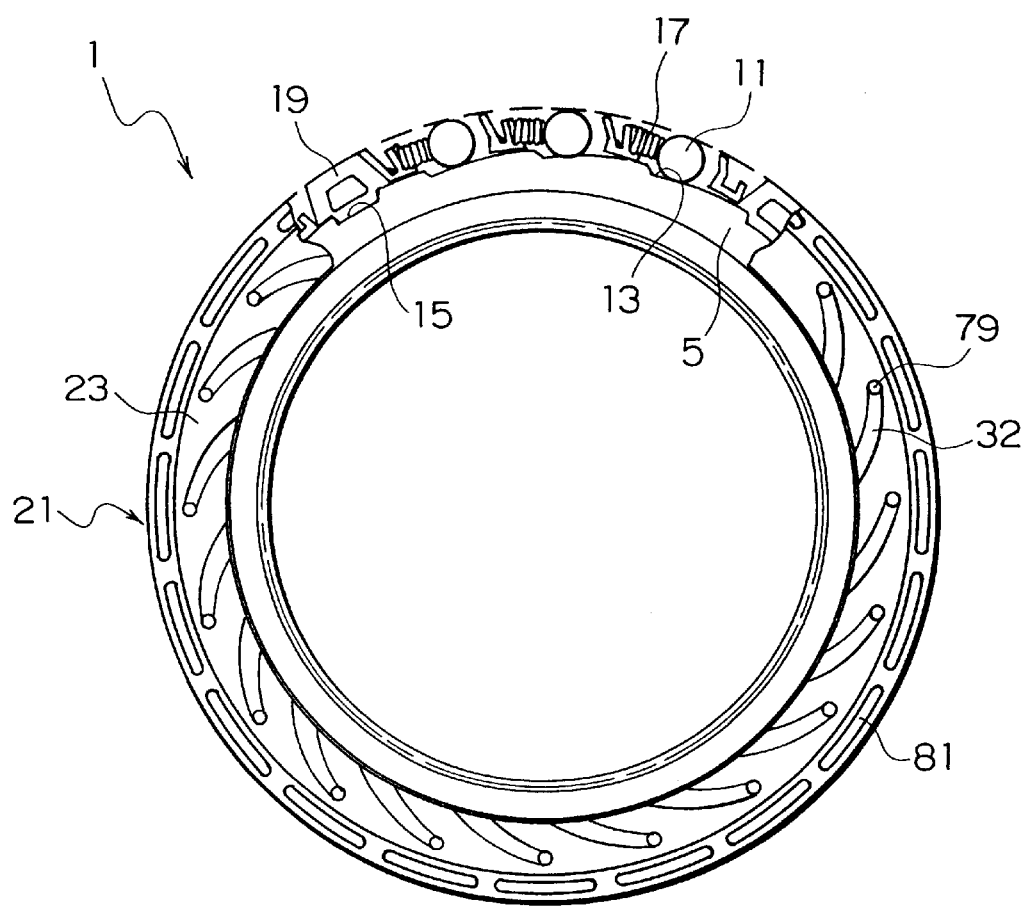
FIG. 14 is a front view of a one-way clutch device according to a fourth embodiment of the present invention.
Figure 15:
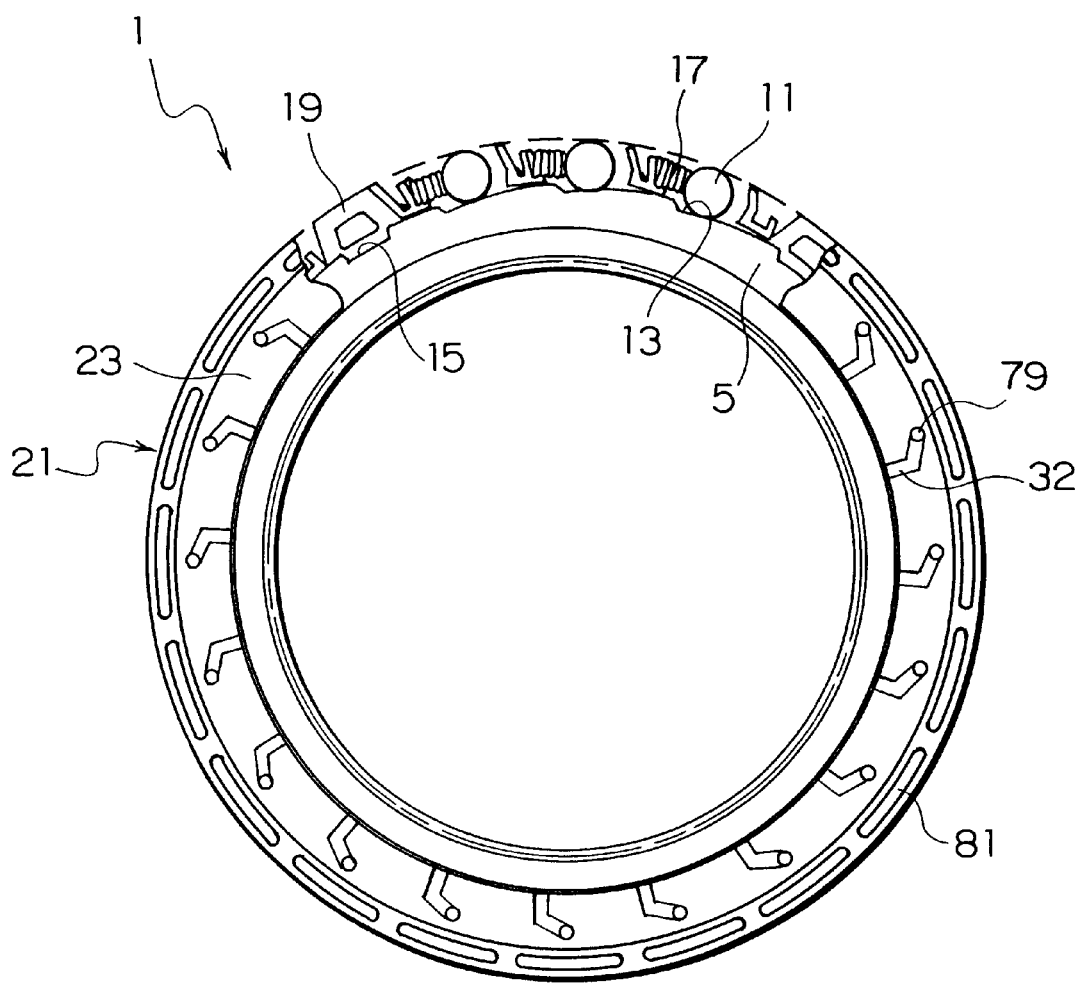
FIG. 15 is a front view of a one-way clutch device according to a fifth embodiment of the present invention.
Figure 16:
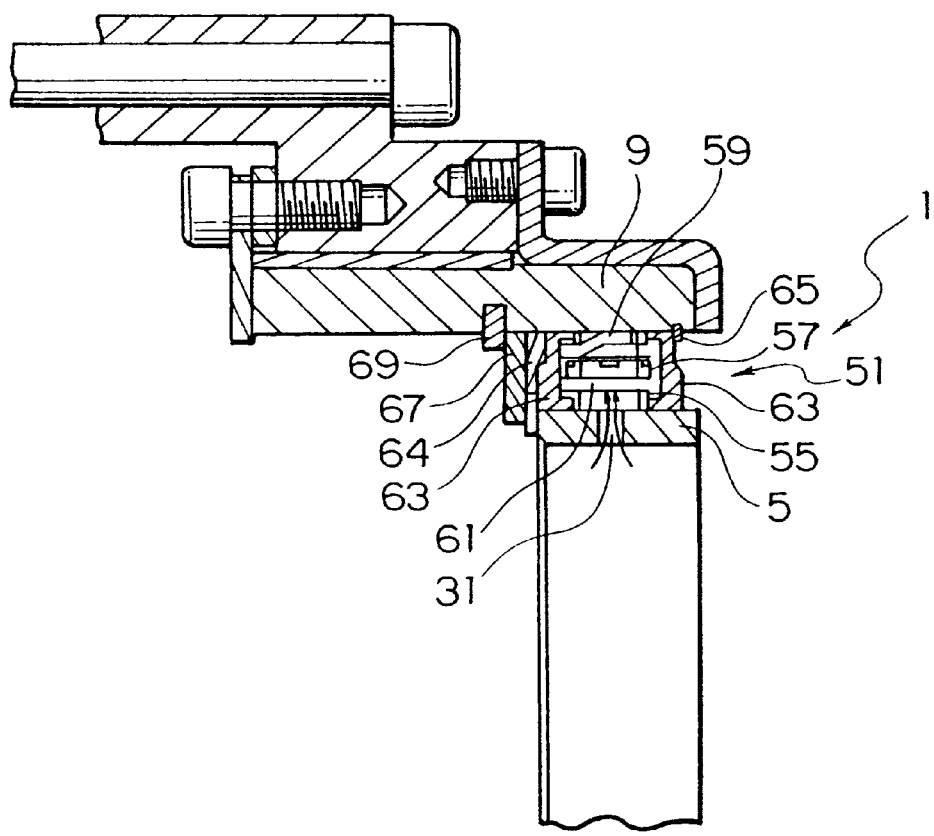
FIG. 16 is a longitudinal cross-sectional view for showing the essential portion of a conventional one-way clutch device.

FIGS. 14 and 15 are front views for respectively showing one-way clutch devices according to the fourth and fifth embodiments of the present invention. The entire structure of these embodiments is substantially the same as that of the foregoing third embodiment, and the operation and the effects are also the same as those of the third embodiments, except the form of the first flange portion 23. Specifically, in the fourth and fifth embodiments, the oil paths 32 each is formed in the shape of a spiral or a hook and the number of such oil paths is different from that of the third embodiment. In addition, communication paths 79 are disposed at the tip ends of all the oil paths 32.

Specific description of the embodiments are as stated above. However, the present invention is not limited to these embodiments, but may be applied, for example, to a one-way clutch device of a type other than the roller type. The oil paths may be formed on a member other than the retainer (such as a side surface of the inner race). Further, as the biasing means for biasing each roller in the direction of engagement, another elastic member such as a coil spring or a synthetic rubber may be employed. Instead of the retainer in the first embodiment, an annular groove may be formed, like in the second embodiment, and the lubricating oil inflow port of the oil path may be further stretched to be capable of communication. Also, the first to fifth embodiments may be applied to a one-way clutch device of the roller type having a cam surface on the outer race side thereof. The specific configuration of the one-way clutch device or the specific form, etc., of the oil path may be properly changed within the scope and the spirit of the present invention.

According to the one-way clutch device of the present invention, it is rendered possible to conduct the lubrication between the inner peripheral surface of the outer race serving as an element on the rotating side and the torque transmitting member, etc., effectively even if the inner race is an element on the fixed side by forming the oil paths, for example, in the flange portion of the retainer, thereby attaining the prolonged life of the device.

What is claimed is:

1. A one-way clutch device, comprising:

an inner race;

a rotatable outer race provided coaxially with said inner race;

a plurality of concave cams formed on an outer peripheral surface of said inner race along a circumferential direction thereof;

a plurality of torque transmitting members interposed between an inner peripheral surface of said outer race and said concave cams, said torque transmitting members being biased in a direction of engagement in said concave cams by at least one biasing member;

block bearings disposed to maintain a gap between said inner race and said outer race; and a retainer attached to said inner race to retain said torque transmitting members, said biasing member and said block bearings;

wherein said retainer is integrally formed at an axial end thereof with an annular flange extending radially inwardly substantially to an end of said inner race;

wherein said annular flange is formed with a plurality of oil paths having oil inflow ports that open radially inwardly to intake lubricating oil around said end of the inner race and oil outflow ports open to supply said lubricating oil into said gap between said inner race and said outer race.

2. A one-way clutch device according to claim 1, further comprising a latching plate disposed adjacent to said annular flange of said retainer and which is rotated relatively to said retainer together with said outer race, wherein portions of said oil paths are open to said latching plate to provide lubrication between said annular flange and said latching plate.

3. A one-way clutch device according to claim 1, wherein said retainer is made of synthetic resin.

4. A one-way clutch device according to claim 3, wherein said oil paths are grooves formed in the annular flange.

5. A one-way clutch device according to claim 1, wherein at least one said oil outflow port is provided to be adjacent to one of a said torque transmitting member and a said block bearing.

6. A one-way clutch device according to claim 1, wherein each of said oil paths is widened at the corresponding oil inflow port.

7. A one-way clutch device according to claim 1, wherein said oil inflow ports of said oil paths are in communication with each other.

8. A one-way clutch device according to claim 1, wherein each of said oil outflow ports of said oil paths is open toward at least one sliding surface of a said torque transmitting member or a said block bearing.

9. A one-way clutch according to claim 8, wherein each of said oil outflow ports has a step portion.

* * * * *